(12) United States Patent
Ohara (10) Patent No.: US 12,194,943 B2
(45) Date of Patent: Jan. 14, 2025

(54) VEHICLE CENTER AIRBAG DEVICE

(71) Applicant: TOYOTA JIDOSHA KABUSHIKI KAISHA, Toyota (JP)

(72) Inventor: Koji Ohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/429,482

(22) Filed: Feb. 1, 2024

(65) Prior Publication Data

US 2024/0286572 A1 Aug. 29, 2024

(30) Foreign Application Priority Data

Feb. 24, 2023 (JP) ................................ 2023-027799

(51) Int. Cl.
*B60R 21/207* (2006.01)
*B60R 21/231* (2011.01)

(52) U.S. Cl.
CPC ...... *B60R 21/207* (2013.01); *B60R 21/23138* (2013.01); *B60R 2021/23146* (2013.01)

(58) Field of Classification Search
CPC ............ B60R 21/207; B60R 21/23138; B60R 2021/23146
See application file for complete search history.

(56) References Cited

U.S. PATENT DOCUMENTS

| | | | |
|---|---|---|---|
| 9,085,280 B2 * | 7/2015 | Katsumata | ........ B60R 21/23138 |
| 9,751,491 B2 * | 9/2017 | Sugimura | ............. B60R 21/233 |
| 9,932,011 B2 * | 4/2018 | Hiraiwa | ................. B60R 21/207 |
| 11,066,036 B2 * | 7/2021 | Gwon | .................... B60R 21/231 |
| 11,254,280 B2 * | 2/2022 | Kobayashi | .......... B60R 21/2338 |
| 11,518,339 B2 * | 12/2022 | Kobayashi | .......... B60R 21/233 |
| 11,691,588 B2 * | 7/2023 | Fukawatase | ............ B60R 21/18 |
| | | | 280/728.2 |
| 2012/0181780 A1 * | 7/2012 | Rickenbach | ........ B60R 21/2346 |
| | | | 280/730.2 |
| 2016/0264091 A1 * | 9/2016 | Fujiwara | ................ B60R 21/207 |
| 2017/0182963 A1 * | 6/2017 | Hiraiwa | .............. B60R 21/2338 |
| 2017/0197579 A1 * | 7/2017 | Taguchi | ............ B60R 21/23138 |
| 2021/0094499 A1 * | 4/2021 | Deng | .................... B60R 21/261 |
| 2021/0129787 A1 * | 5/2021 | Kobayashi | .......... B60R 21/2346 |
| 2021/0138993 A1 * | 5/2021 | Kobayashi | ........ B60R 21/23138 |

(Continued)

FOREIGN PATENT DOCUMENTS

JP 2009-166786 A 7/2009
JP 2019-059381 A 4/2019

*Primary Examiner* — Toan C To
(74) *Attorney, Agent, or Firm* — SOLARIS Intellectual Property Group, PLLC (57) ABSTRACT

A vehicle center airbag device includes: an inflator that is provided at a vehicle seat, and that is configured to eject gas due to being actuated; and a center airbag that is provided at a side portion at a vehicle width direction inner side of a seatback of the vehicle seat, and that is configured to inflate and deploy toward a vehicle width direction inner side of an occupant seated in the vehicle seat due to the gas being supplied to an interior thereof; and an introduction path that is provided at an upper portion thereof the center airbag, into which gas that has been ejected from the inflator is introduced, wherein the introduction path includes opening portions that eject the gas toward a vehicle lower side, at an intermediate portion thereof.

4 Claims, 6 Drawing Sheets

(56) References Cited

U.S. PATENT DOCUMENTS

2022/0363215 A1\* 11/2022 Yuki ................. B60R 21/23138
2022/0388471 A1\* 12/2022 Yuki ..................... B60R 21/239
2024/0140346 A1\* 5/2024 Nagasawa ............. B60R 21/233

\* cited by examiner

VEHICLE CENTER AIRBAG DEVICE

CROSS-REFERENCE TO RELATED APPLICATION

This application is based on and claims priority under 35 USC 119 from Japanese Patent Application No. 2023-027799, filed on Feb. 24, 2023, the disclosure of which is incorporated by reference herein.

BACKGROUND

Technical Field

The present disclosure relates to a vehicle center airbag device.

Related Art

A far side airbag device that is installed at a side portion at a vehicle width direction inner side (i.e., central side) of a driver's seat, and that inflates and deploys a center airbag with inflation gas between the driver's seat and an adjacent passenger seat is conventionally known (refer to, for example, Japanese Patent Application Laid-Open (JP-A) No. 2019-059381). This center airbag includes an annular coupling portion (i.e., non-inflating portion) that regulates a thickness of a central portion of the center airbag.

However, in the center airbag having the above-described configuration, when gas has been supplied from a rear end portion, the gas is divided between an upper side and a lower side of the annular coupling portion and flows toward a front end portion side, and therefore, the front end portion side of the center airbag may swing significantly during inflation and deployment. When the front end portion side of the center airbag swings significantly during inflation and deployment of the center airbag, a position at which a head of an occupant contacts the center airbag varies, and it becomes difficult to effectively restrain the head of the occupant.

SUMMARY

Thus, the present disclosure provides a vehicle center airbag device that is capable of suppressing swinging of a front end portion side of a center airbag at a time of inflation and deployment of the center airbag.

A vehicle center airbag device according to a first aspect of the present disclosure includes: an inflator that is provided at a vehicle seat, and that ejects gas due to being actuated; and a center airbag that is provided at a side portion at a vehicle width direction inner side of a seatback of the vehicle seat, and that inflates and deploys toward a vehicle width direction inner side of an occupant seated in the vehicle seat due to the gas being supplied to an interior thereof, and an introduction path that is provided at an upper portion thereof the center airbag, into which gas that has been ejected from the inflator is introduced, wherein the introduction path includes plural opening portions that eject the gas toward a vehicle lower side, at an intermediate portion thereof.

According to the first aspect, at a time of a side collision of a vehicle, the inflator is actuated, and the gas that has been ejected from the inflator is supplied to the interior of the center airbag. Consequently, the center airbag inflates and deploys toward the vehicle width direction inner side of the occupant seated in the vehicle seat. It should be noted that "at a time of a side collision of a vehicle" includes not only a time when a side collision of the vehicle has been detected, but also a time when a side collision of the vehicle has been predicted.

Further, the center airbag includes the introduction path into which the gas that has been ejected from the inflator is introduced, at the upper portion thereof. Furthermore, the introduction path includes the plural opening portions that eject the gas toward the vehicle lower side, at the intermediate portion thereof. Accordingly, the center airbag is inflated and deployed in a manner similar to lowering a shutter from the vehicle upper side toward the vehicle lower side, and therefore, swinging of a front end portion side of the center airbag is suppressed.

A vehicle center airbag device according to a second aspect of the present disclosure is the vehicle center airbag device according to the first aspect, wherein the introduction path includes an auxiliary opening portion that is smaller in diameter than the opening portions, at least at a rear portion of the introduction path among a front end portion and the rear portion of the introduction path.

According to the second aspect, among the front end portion and the rear portion of the introduction path, the auxiliary opening portion that is smaller in diameter than the opening portions is formed at least at the rear portion. Accordingly, delay in deployment of the center airbag is suppressed.

Further, a vehicle center airbag device according to a third aspect of the present disclosure is the vehicle center airbag device according to the second aspect, wherein the front end portion of the introduction path extends to a front end lower portion of the center airbag and is closed off.

According to the third aspect, the front end portion of the introduction path extends to the front end lower portion of the center airbag, and the front end portion of the introduction path is closed off. Consequently, the front end portion side of the center airbag is inflated and deployed prior to other portions thereof. Accordingly, swinging of the front end portion side of the center airbag is more effectively suppressed, compared to a case in which, for example, the front end portion of the introduction path extends only to a front end upper portion of the center airbag, and an auxiliary opening portion is formed at the front end portion of the introduction path.

Further, a vehicle center airbag device according to a fourth aspect of the present disclosure is the vehicle center airbag device of any one of the first to the third aspects, wherein the introduction path is formed by sewing a base cloth of the center airbag, or is formed by a tube that is provided at the interior of the center airbag.

According to the fourth aspect, the introduction path is formed by sewing a base cloth of the center airbag, or is formed by a tube that is provided at the interior of the center airbag. Accordingly, the introduction path is formed easily.

Further, a vehicle center airbag device according to a fifth aspect of the present disclosure is the vehicle center airbag device according to the fourth aspect, wherein each of the opening portions is formed in a tube shape that projects toward the vehicle lower side.

According to the fifth aspect, each of opening portions is formed in a tube shape that projects toward the vehicle lower side. Accordingly, a stronger gas flow is formed, compared to a case in which the opening portions are not formed in tube shapes that project toward the vehicle lower side.

As described above, according to the present disclosure, swinging of a front end portion side of a center airbag can be suppressed at a time of inflation and deployment of the center airbag.

DETAILED DESCRIPTION

Detailed explanation follows regarding exemplary embodiments of the present disclosure, based on the drawings. It should be noted that, for convenience of explanation, arrow UP illustrated in the respective drawings indicates an upward direction of a vehicle and a vehicle seat, arrow FR indicates a frontward direction of the vehicle and the vehicle seat, and arrow LH indicates a leftward direction of the vehicle and the vehicle seat. Thus, in the following explanation, in cases in which up-down, front-rear, and left-right directions are described without any particular notation to the contrary, these indicate up and down, front and rear, and left and right with respect to the vehicle and the vehicle seat. Further, the left-right direction is synonymous with a vehicle width direction and a seat width direction.

Figure 1:
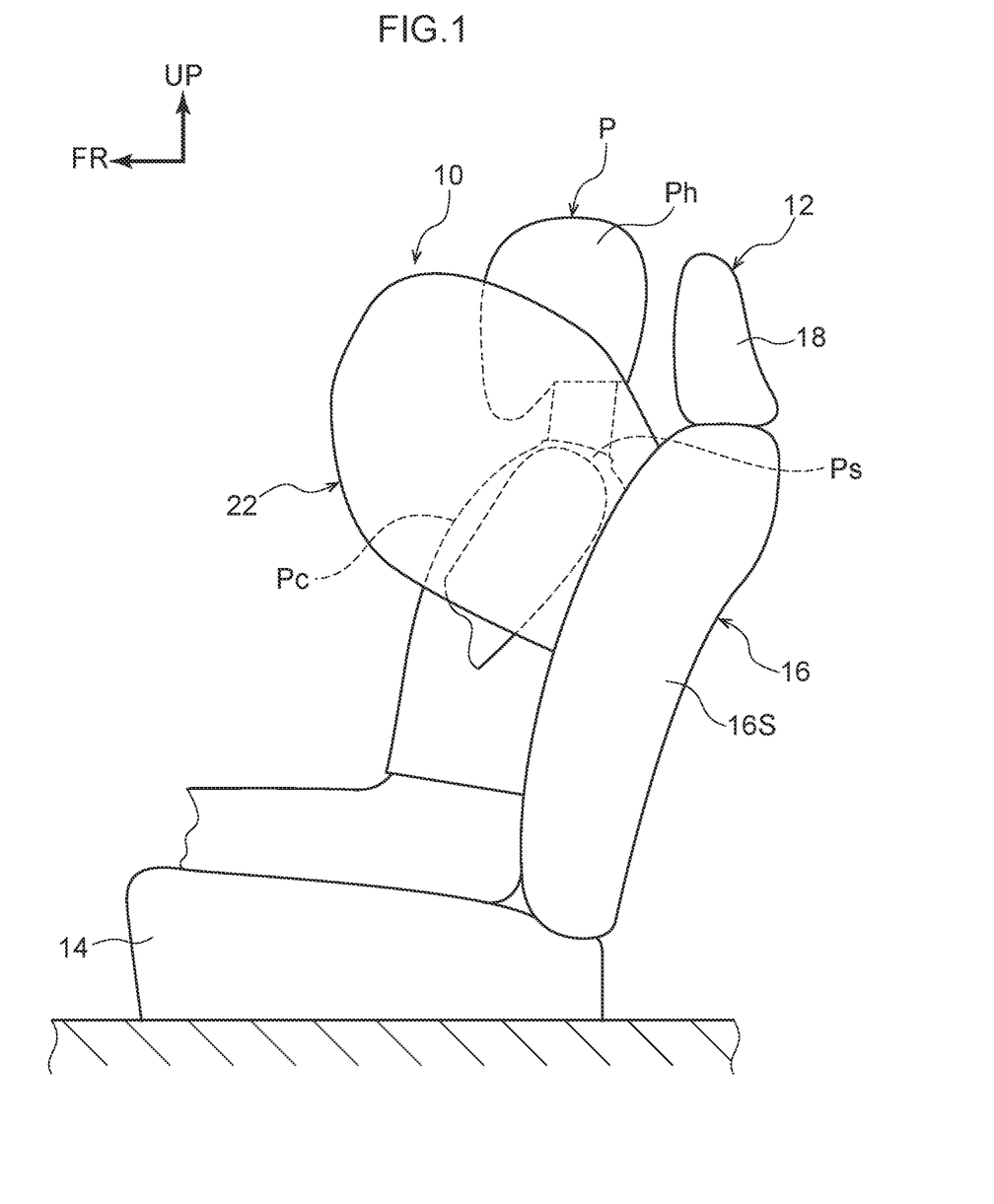
FIG. 1 is a schematic side view illustrating an inflated and deployed state of a center airbag according to a first exemplary embodiment.

Further, as an example, an "occupant P" illustrated in FIG. 1 is an occupant corresponding to an AM50 (i.e., 50th percentile of American adult males) World Side Impact Dummy (World SID). A vehicle seat 12 (refer to FIG. 1) in which the occupant P is seated is, for example, a front left-side seat that is provided in a passenger compartment of a vehicle.

First Exemplary Embodiment

First, a first exemplary embodiment will be explained. As illustrated in FIG. 1, the vehicle seat 12 at which a vehicle center airbag device (hereafter also referred to simply as a "center airbag device") 10 according to the first exemplary embodiment is installed includes a seat cushion 14 at which the occupant P is seated (i.e., supporting buttocks and thighs of the occupant P), a seatback 16 that supports a back of the occupant P, and a headrest 18 that supports a head Ph of the occupant P.

In a side view viewed from the vehicle width direction (i.e., seat width direction), the seat cushion 14 extends in the front-rear direction, and the seatback 16 is coupled to a rear end portion of the seat cushion 14 so as to be rotatable with the seat width direction as an axial direction, and extends in the up-down direction. The headrest 18 is provided so as to be capable of moving up and down at a seat width direction central portion of an upper end portion of the seatback 16. It should be noted that the occupant P is restrained at the vehicle seat 12 by a seatbelt device (not illustrated in the drawings).

Figure 2:
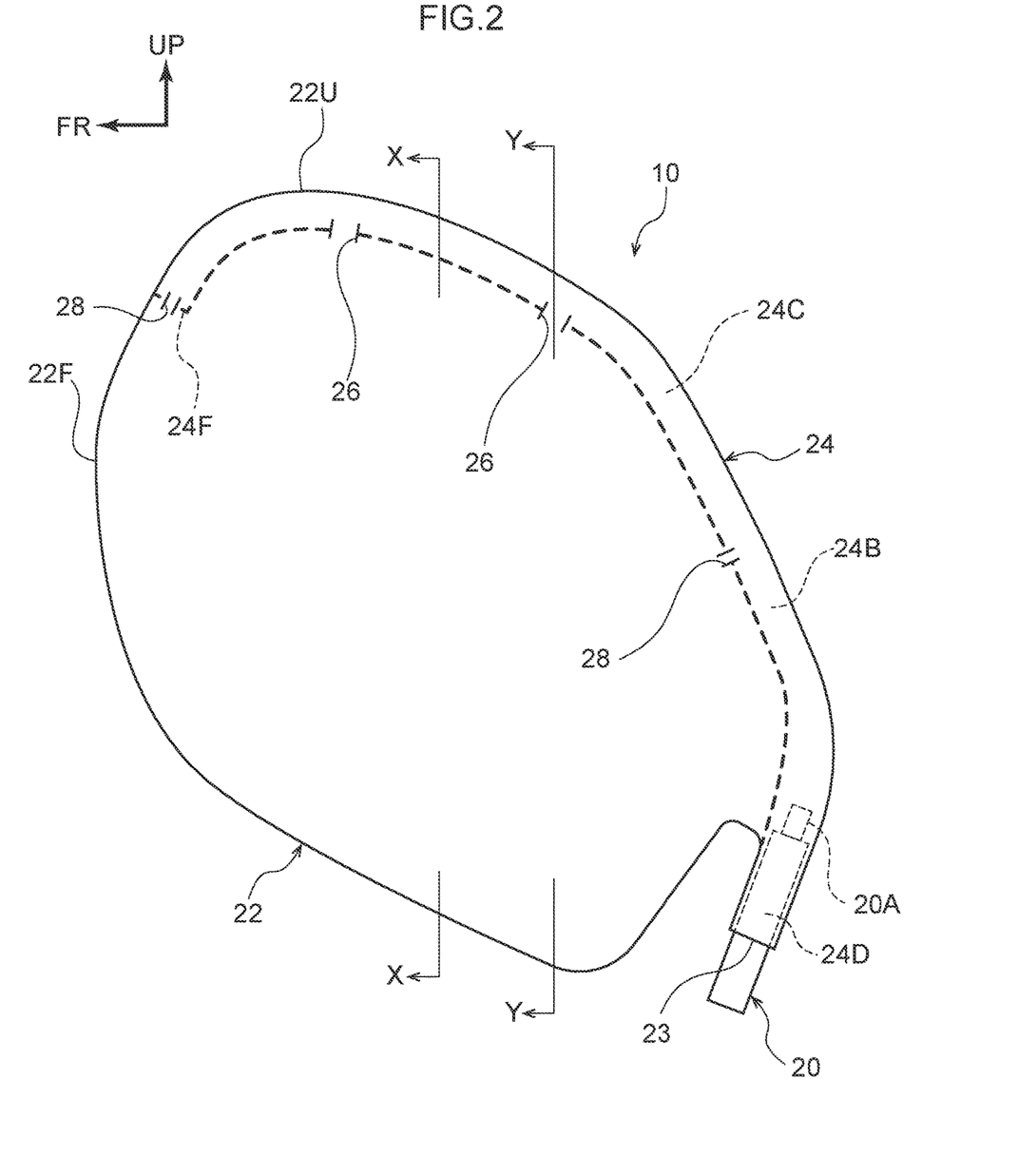
FIG. 2 is a schematic side view illustrating an enlarged view of the center airbag according to the first exemplary embodiment, after inflation and deployment have been completed.
Figure 3A:
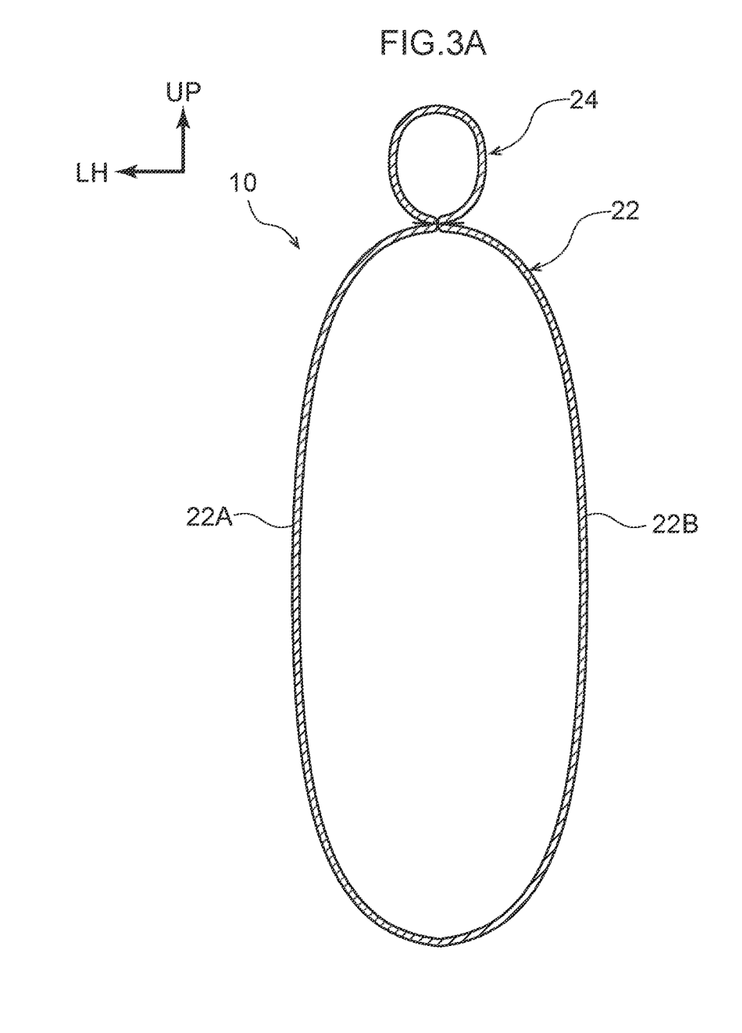
FIG. 3A is a schematic cross-sectional view taken along line X-X in FIG. 2.
Figure 3B:
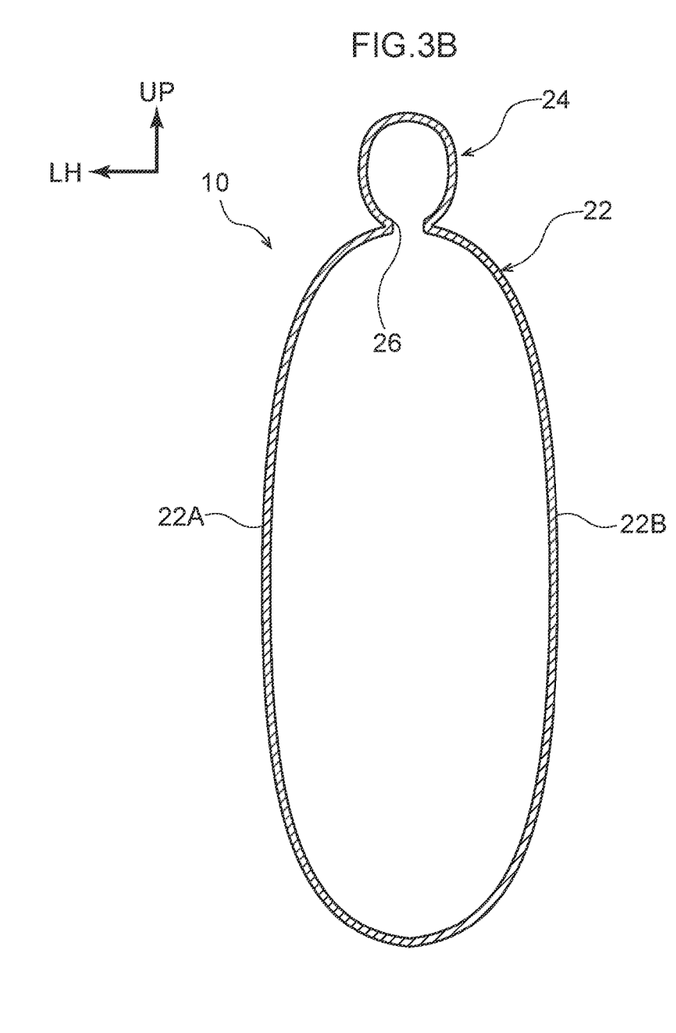
FIG. 3B is a schematic cross-sectional view taken along line Y-Y in FIG. 2.

Further, the center airbag device 10 is provided at a side portion at a left side (hereafter referred to as a "left side portion 16S"), which is a side portion at a vehicle width direction inner side of the seatback 16. As illustrated in FIG. 2, FIG. 3A and FIG. 3B, the center airbag device 10 is configured to include an inflator 20 that is embedded at the left side portion 16S of the seatback 16, and a center airbag 22 that includes, at an upper portion thereof, an introduction path 24 into which gas that has been ejected from the inflator 20 is introduced.

The inflator 20 is a cylinder-type gas generating device that is formed in a substantially cylindrical shape, and an axial direction thereof is a direction (substantially the up-down direction) along a side frame (not illustrated in the drawings) configuring a frame at both left and right side portions of the seatback 16. The inflator 20 is actuated when a side collision of the vehicle has been detected or predicted (hereinafter referred to as a "time of a side collision"), and is capable of supplying gas to an interior of the center airbag 22 via the introduction path 24.

The center airbag 22 is formed in a single bag shape by sewing together an outer peripheral edge portion of a base cloth 22A at a seat width direction outer side and an outer peripheral edge portion of a base cloth 22B at a seat width direction inner side, and is folded and in a predetermined folding manner to be housed at the left side portion 16S of the seatback 16. The center airbag 22 is formed in a substantially elliptical shape that bulges toward a front upper side so as to be capable of restraining the head Ph of the occupant P, in a side view after inflation and deployment have been completed.

The introduction path 24 is formed by sewing together portions of the base cloth 22A and the base cloth 22B at an upper portion of the center airbag 22 (specifically, portions a predetermined distance toward an inner side from the outer peripheral edge portions of the base cloth 22A and the base cloth 22B). A lower end portion 24D that is positioned at a rear side of the introduction path 24 is configured as a tube-shaped insertion portion 23, and an upper portion 20A that includes an ejection port of the inflator 20 is inserted into, and connected to, the insertion portion 23. A front end portion 24F of the introduction path 24 extends beyond an upper end portion 22U that is positioned at an uppermost side of the center airbag 22 to an upper portion (front end upper portion) of a front end portion 22F that is positioned at a frontmost side.

Further, plural opening portions (hereafter referred to as "main opening portions") 26 that eject introduced gas toward a lower side are formed at an intermediate portion 24C of the introduction path 24. The main opening portions 26 are formed by not sewing together the base cloth 22A and the base cloth 22B, and, for example, one of the main opening portions 26 illustrated in the drawings is formed in a vicinity of the upper end portion 22U of the center airbag 22 (slightly toward a rear side of the upper end portion 22U), and another main opening portion 26 is formed at a predetermined spacing further toward the rear side therefrom.

Further, an auxiliary opening portion 28 that is smaller in diameter than the main opening portions 26 is formed at a front end portion 24F of the introduction path 24. Furthermore, an auxiliary opening portion 28 that is smaller in diameter than the main opening portions 26 is also formed at a rear portion 24B of the introduction path 24 (further toward an upper side than the insertion portion 23 and further toward a rear side than the main opening portion 26 at the rear side). It should be noted that the auxiliary opening portions 28 are also formed by not sewing together the base cloth 22A and the base cloth 22B.

Accordingly, a configuration is provided such that gas that has been ejected from the inflator 20 and introduced into the introduction path 24 is blown out toward the lower side from the main opening portions 26 and the auxiliary opening portions 28 formed at the introduction path 24 and is supplied to the interior of the center airbag 22, and the center airbag 22 is inflated and deployed in a manner similar to lowering a shutter from the upper side to the lower side. Namely, the center airbag 22 is configured so as to be inflated and deployed toward a vehicle width direction inner side of the head Ph, a shoulder region Ps, and a chest region Pc of the occupant P seated in the vehicle seat 12, in an order of the head Ph, the shoulder region Ps, and the chest region Pc of the occupant P.

Next, operation of the vehicle center airbag device 10 according to the first exemplary embodiment configured as described above will be explained.

At the time of a side collision of the vehicle, the inflator 20 is actuated, and gas that has been ejected from the inflator 20 is instantaneously supplied to the interior of the introduction path 24, and is supplied to the interior of the center airbag 22 through the main opening portions 26 and the auxiliary opening portions 28 of the introduction path 24. When this occurs, an epidermis extending from an upper end portion to a lower end portion of the left side portion 16S of the seatback 16 is broken due to internal pressure (inflation pressure) of the center airbag 22 that has started to be inflated due to the supply of gas.

Namely, an upper portion of the center airbag 22 is inflated and deployed earlier, and the center airbag 22 is inflated and deployed toward left side surfaces (vehicle width direction inner sides) of the head Ph, the shoulder region Ps, and the chest region Pc of the occupant P in this order. Consequently, the left side surfaces of the head Ph, the shoulder region Ps, and the chest region Pc of the occupant P are covered from the left side by the center airbag 22. Accordingly, at the time of a side collision of the vehicle, the left side surfaces of the head Ph, the shoulder region Ps, and the chest region Pc of the occupant P can be restrained by the center airbag 22.

As described above, the center airbag 22 has the introduction path 24 into which gas that has been ejected from the inflator 20 is introduced, at the upper portion thereof. The introduction path 24 includes the plural main opening portions 26 that eject gas toward the lower side at the intermediate portion 24C, and further includes the auxiliary opening portions 28 at the front end portion 24F and the rear portion 24B.

Accordingly, since the flow of gas from the upper side toward the lower side in the center airbag 22 becomes stronger, and the center airbag 22 is inflated and deployed from the upper side toward the lower side in a manner similar to lowering a shutter, swinging of the front end portion 22F side of the center airbag 22 can be suppressed or reduced. Consequently, variation in a position of the center airbag 22 at which it contacts the head Ph of the occupant P is suppressed, and therefore, the head Ph of the occupant P can be effectively restrained (i.e., restraining performance with respect to the occupant P can be secured).

Since swinging of the front end portion 22F side of the center airbag 22 is suppressed as described above, it is not necessary to form the center airbag 22 with a large size in consideration of swinging thereof, whereby size reduction, weight reduction, and cost reduction can be achieved. Further, since the auxiliary opening portion 28 is formed at least at the rear portion 24B of the introduction path 24, delay in deployment of the center airbag 22 can be suppressed. Moreover, since the introduction path 24 is formed by sewing the base cloth 22A and the base cloth 22B of the center airbag 22, the introduction path 24 can be formed easily, and a reduction in productivity of the center airbag 22 can be suppressed.

Second Exemplary Embodiment

Next, a second exemplary embodiment will be explained. It should be noted that portions that are equivalent to those in the first exemplary embodiment are assigned the same reference numerals, and detailed explanation thereof (including common operation) is appropriately omitted.

Figure 4A:
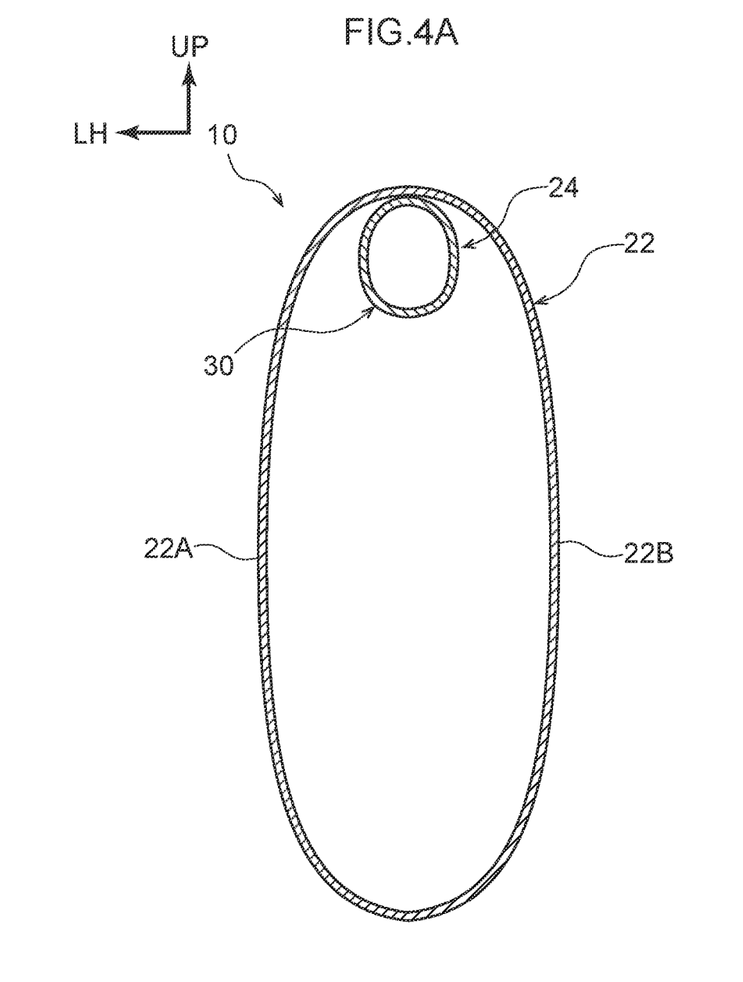
FIG. 4A is a schematic cross-sectional view corresponding to the view along line X-X in FIG. 2, according to a second exemplary embodiment.
Figure 4B:
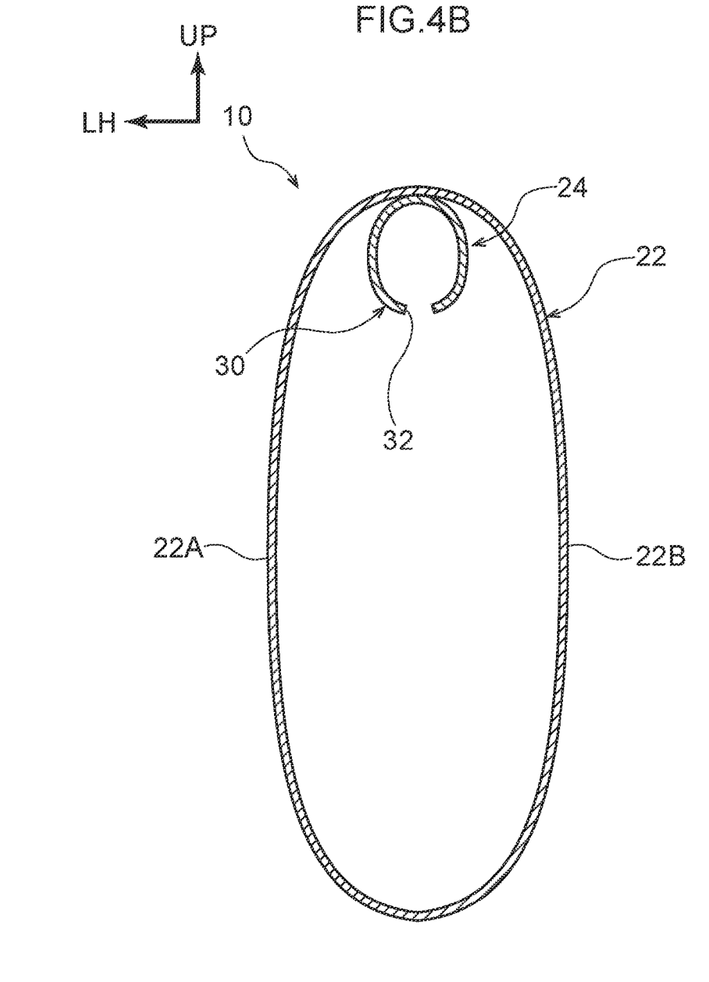
FIG. 4B is a schematic cross-sectional view corresponding to the view along line Y-Y in FIG. 2, according to the second exemplary embodiment.

As illustrated in FIG. 4A and FIG. 4B, the second exemplary embodiment is different from the first exemplary embodiment only in that the introduction path 24 is formed by a tube 30 that is provided at the interior of the center airbag 22. Although not illustrated in the drawings, the tube 30 is disposed at an upper portion in the interior of the center airbag 22 by sewing an upper end edge portion of the tube 30 together with the outer peripheral edge portion of the base cloth 22A and the outer peripheral edge portion of the base cloth 22B.

Further, the tube 30 has an equivalent configuration to that of the introduction path 24 in the first exemplary embodiment. Namely, although not illustrated in the drawings, a lower end portion that is positioned at a rear side of the tube 30 is configured as a tube-shaped insertion portion, and the upper portion 20A including the ejection port of the inflator 20 is inserted into, and connected to, the insertion portion. Furthermore, a front end portion of the tube 30 extends beyond the upper end portion 22U of the center airbag 22 to the upper portion (front end upper portion) of the front end portion 22F.

Further, plural main opening portions 32 that eject introduced gas toward the lower side are formed at an intermediate portion of the tube 30. The main opening portions 32 are configured with, for example, a circular shape, and are formed at the same positions as the main opening portions 26 of the introduction path 24. Furthermore, a circular-shaped auxiliary opening portion (not illustrated in the drawings) is formed at a front end portion of the tube 30 in the same manner as the auxiliary opening portion 28 of the introduction path 24, and a circular-shaped auxiliary opening portion (not illustrated in the drawings) is also formed at a rear portion of the tube 30 in the same manner as the auxiliary opening portion 28 of the introduction path 24.

In the second exemplary embodiment as well, which is configured as described above, since the center airbag 22 is inflated and deployed in a manner similar to lowering a shutter from the upper side to the lower side, swinging of the front end portion 22F side of the center airbag 22 can be suppressed. Consequently, variation in the position of the center airbag 22 at which it contacts the head Ph of the occupant P is suppressed, and therefore, the head Ph of the occupant P can be effectively restrained. Further, since the introduction path 24 is formed by the tube 30 that is provided at the interior of the center airbag 22, the introduction path 24 can be formed easily, and a reduction in productivity of the center airbag 22 can be suppressed.

Third Exemplary Embodiment

Next, a third exemplary embodiment will be explained. It should be noted that portions that are equivalent to those in the first exemplary embodiment are assigned the same reference numerals, and detailed explanation thereof (including common operation) is appropriately omitted.

Figure 5A:
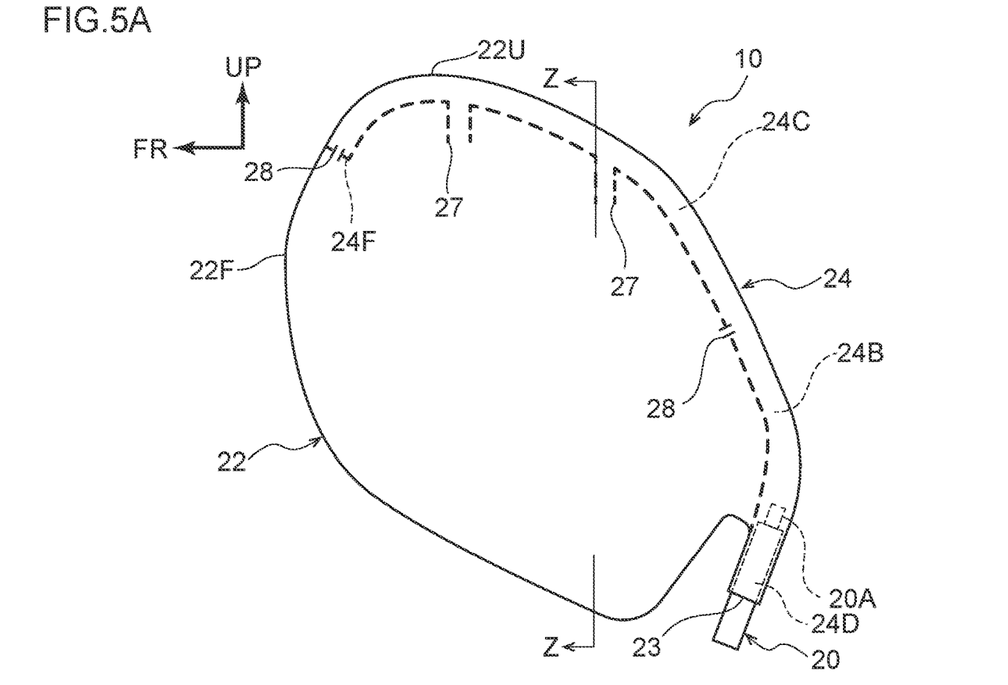
FIG. 5A is a schematic side view illustrating an enlarged view of a center airbag according to a third exemplary embodiment, after inflation and deployment have been completed.
Figure 6A:
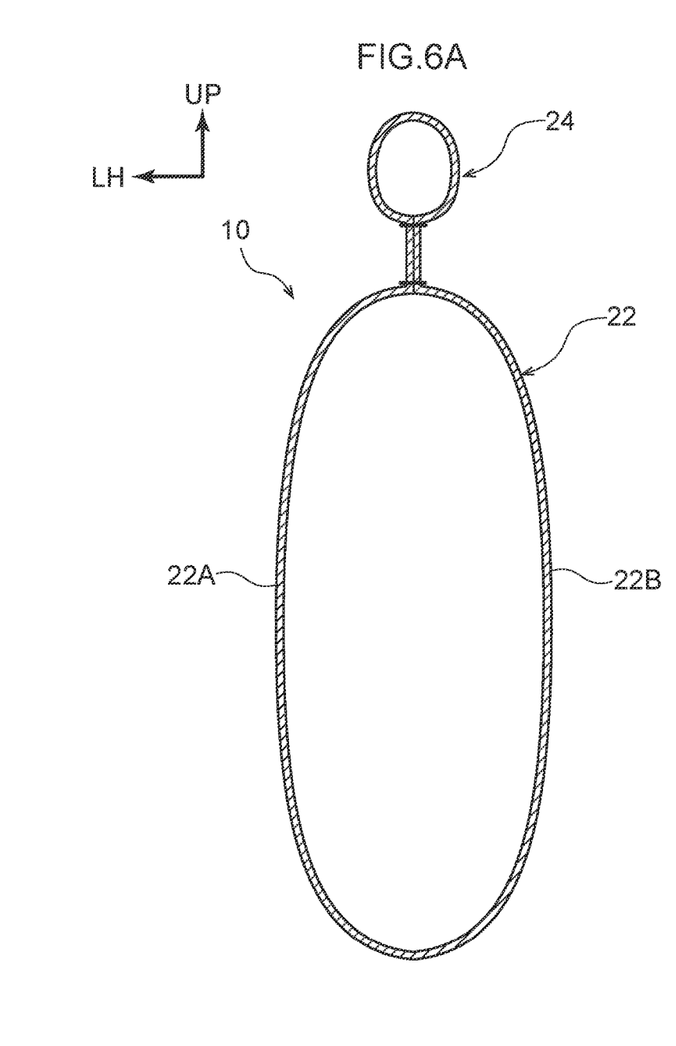
FIG. 6A is a schematic cross-sectional view taken along line Z-Z in FIG. 5A.

As illustrated in FIG. 5A and FIG. 6A, the third exemplary embodiment is different from the first exemplary embodiment only in that each of the main opening portions 26 is formed in a tube shape projecting toward the lower side. Namely, in the third exemplary embodiment, at portions at which the main opening portions 26 of the first exemplary embodiment are formed, portions of the base cloth 22A and the base cloth 22B are sewn together so as to extend a predetermined length toward the lower side, whereby tube-shaped main opening portions 27 that restrict (limit) diffusion of gas in the front-rear direction when gas is ejected are formed.

Thus, in a case in which the main opening portions 27 are formed in a tube shape projecting toward the lower side in this manner, a stronger gas flow toward the lower side can be formed, compared to a case in which the main opening portions 26 are not formed in a tube shape projecting toward the lower side as in the first exemplary embodiment. Accordingly, the center airbag 22 in the third exemplary embodiment can be inflated and deployed from the upper side toward the lower side earlier than in the case of the first exemplary embodiment, and swinging of the front end portion 22F side of the center airbag 22 can be suppressed more effectively.

Figure 6B:
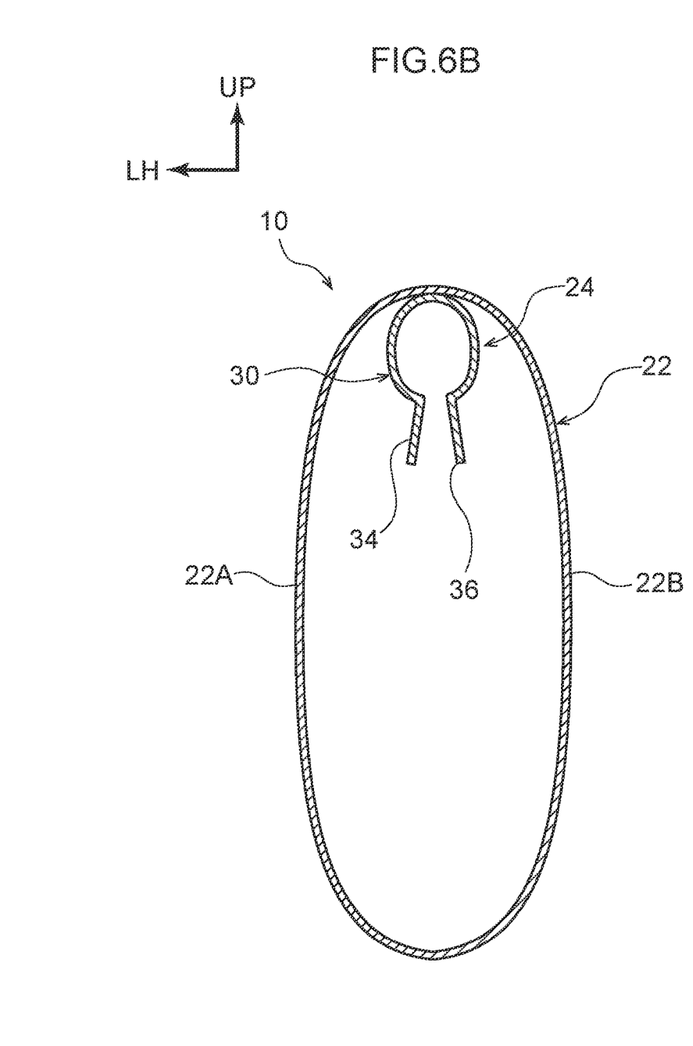
FIG. 6B is a schematic cross-sectional view corresponding to the view along line Z-Z in FIG. 5A, in a case in which an introduction path according to the second exemplary embodiment is configured with a tube.

It should be note that a similar configuration can be applied in a case in which the introduction path 24 is configured with the tube 30. Namely, as illustrated in FIG. 6B, a cylindrical portion 34 extending toward the lower side is integrally formed at each portion of the tube 30 at which the main opening portion 32 (refer to FIG. 4B) is formed. Consequently, since a cylindrical main opening portion 36 is formed, when gas is ejected, diffusion of gas can be restricted (or limited) not only in the front-rear direction, but toward the entire radial direction outer side thereof as viewed along an axial direction of the main opening portion 36, and a stronger gas flow toward the lower side can be formed than in the case of the main opening portions 27.

Fourth Exemplary Embodiment

Lastly, a fourth exemplary embodiment will be explained. It should be noted that portions that are equivalent to those in the first exemplary embodiment are assigned the same reference numerals, and detailed explanation thereof (including common operation) is appropriately omitted.

Figure 5B:
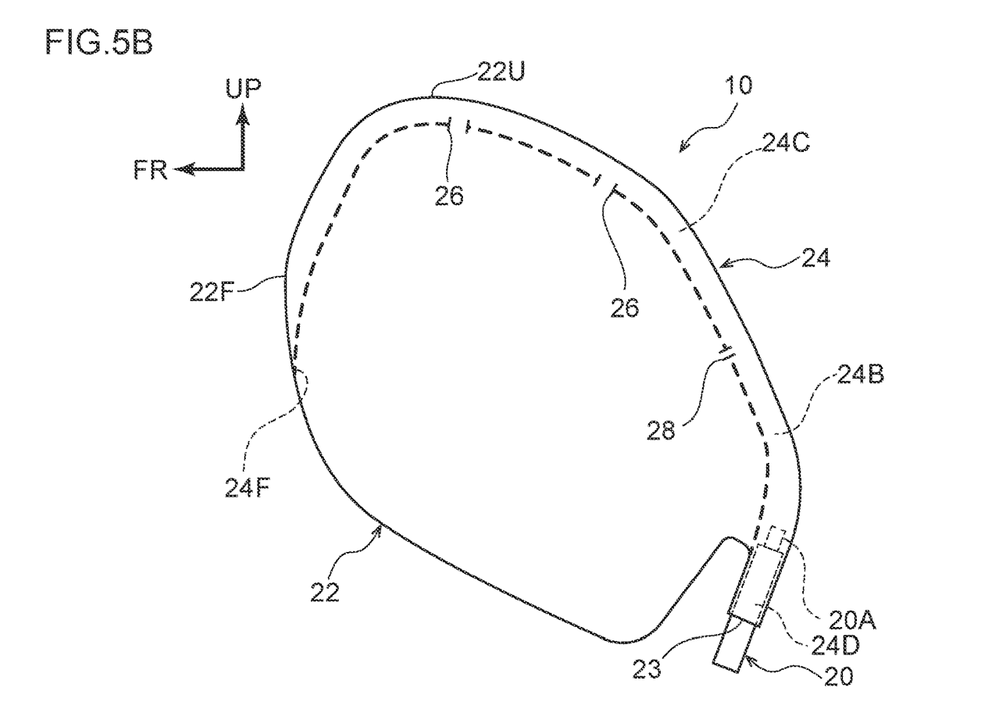
FIG. 5B is a schematic side view illustrating an enlarged view of a center airbag according to a fourth exemplary embodiment, after inflation and deployment have been completed.

As illustrated in FIG. 5B, the fourth exemplary embodiment is different from the first exemplary embodiment only in that the front end portion 24F of the introduction path 24 extends to a lower portion (front end lower portion) of the front end portion 22F of the center airbag 22, and in that the front end portion 24F of the introduction path 24 is closed off. Namely, in the fourth exemplary embodiment, an auxiliary opening portion 28 is not formed at the front end portion 24F of the introduction path 24, and the auxiliary opening portion 28 is formed only at the rear portion 24B of the introduction path 24.

According to the fourth exemplary embodiment configured as described above, since the front end portion 22F side of the center airbag 22 is inflated and deployed (i.e., inflation and deployment are completed) prior to other portions thereof, swinging of the front end portion 22F side of the center airbag 22 can be more effectively suppressed, compared to a case in which the front end portion 24F of the introduction path 24 extends only to the upper portion (front end upper portion) of the front end portion 22F of the center airbag 22, and the auxiliary opening portion 28 is formed at the front end portion 24F of the introduction path 24, as in the first exemplary embodiment.

Although the vehicle center airbag device 10 according to the present exemplary embodiments has been explained above based on the drawings, the vehicle center airbag device 10 according to the present exemplary embodiments is not limited to that which is illustrated in the drawings, and appropriate design modifications can be implemented within a range that does not depart from the spirit of the present disclosure.

For example, it is sufficient that the auxiliary opening portion 28 is formed at least at the rear portion 24B, among the front end portion 24F and the rear portion 24B of the introduction path 24. Further, a configuration may be provided such that a diameter of each of the main opening portions 26, 27, 32, and 36 is, for example, formed to be slightly smaller in diameter at the front side than at the rear side.

What is claimed is:
1. A vehicle center airbag device comprising:
   an inflator that is provided at a vehicle seat, and that is configured to eject gas due to being actuated; and
   a center airbag that is provided at a side portion at a vehicle width direction inner side of a seatback of the vehicle seat, and that is configured to inflate and deploy toward a vehicle width direction inner side of an occupant seated in the vehicle seat due to the gas being supplied to an interior thereof; and
   an introduction path that is provided at an upper portion thereof the center airbag, into which gas that has been ejected from the inflator is introduced,
   wherein the introduction path includes a plurality of opening portions that eject the gas toward a vehicle lower side, at an intermediate portion thereof, and
   wherein the introduction path includes an auxiliary opening portion that is smaller in diameter than the plurality of opening portions, at least at a rear portion of the introduction path among a front end portion and the rear portion of the introduction path.
2. The vehicle center airbag device according to claim 1, wherein the front end portion of the introduction path extends to a front end lower portion of the center airbag and is closed off.
3. The vehicle center airbag device according to claim 1, wherein the introduction path is formed by sewing a base cloth of the center airbag, or is formed by a tube that is provided at the interior of the center airbag.

4. The vehicle center airbag device according to claim 3, wherein each of the plurality of opening portions is formed in a tube shape that projects toward the vehicle lower side.

* * * * *